J. H. TOMLINSON.
SIGHT TESTING APPARATUS.
APPLICATION FILED JAN. 21, 1908.

926,035.

Patented June 22, 1909.
6 SHEETS—SHEET 1.

Witnesses:
A. H. Rabsag,

Inventor:—
John Henry Tomlinson
by H. Evarts
attorneys

J. H. TOMLINSON.
SIGHT TESTING APPARATUS.
APPLICATION FILED JAN. 21, 1908.

926,035.

Patented June 22, 1909.
6 SHEETS—SHEET 3.

Witnesses.—
N. Louis Bogan
G. Notes.

Inventor.—
John H. Tomlinson
By H. C. Evert & Co.
attys.

J. H. TOMLINSON.
SIGHT TESTING APPARATUS.
APPLICATION FILED JAN. 21, 1908.
926,035.
Patented June 22, 1909.
6 SHEETS—SHEET 4.
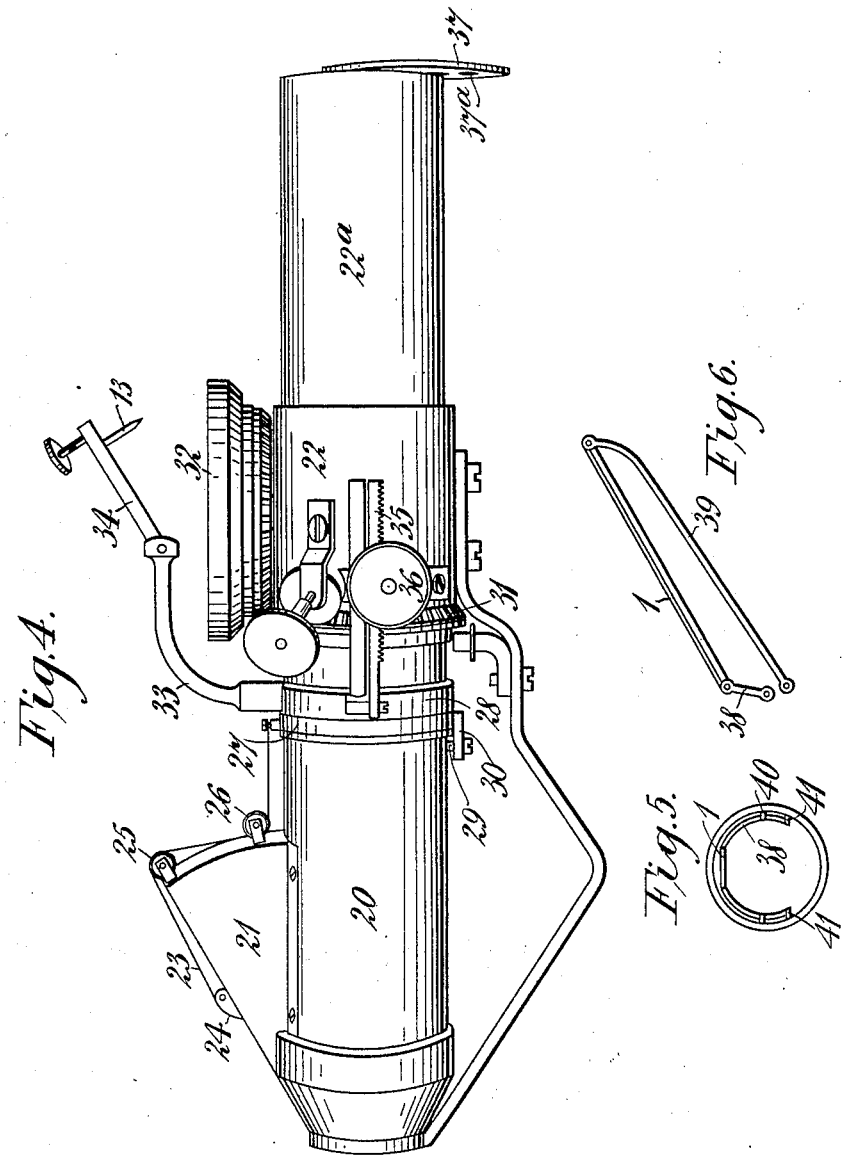
Witnesses—
A. H. Rabsag
Max H. Swlowtz
Inventor.—
John Henry Tomlinson
by: H C Everett
attorneys

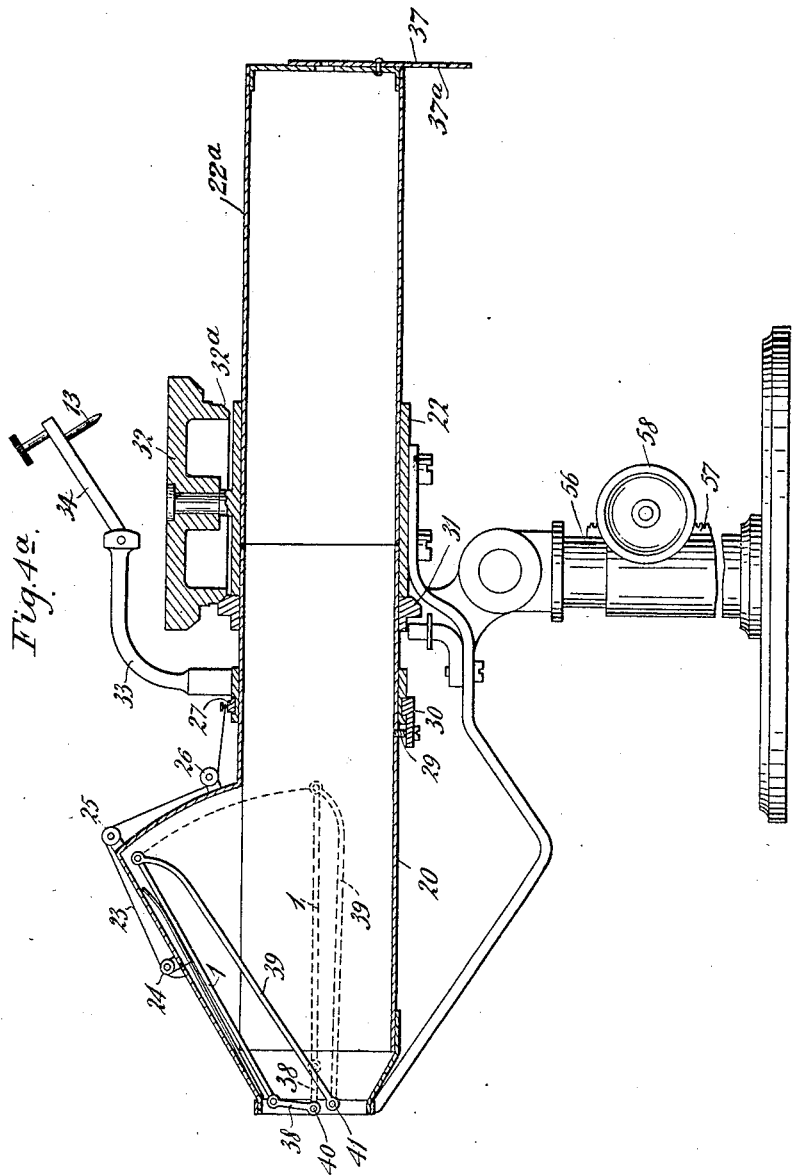

J. H. TOMLINSON.
SIGHT TESTING APPARATUS.
APPLICATION FILED JAN. 21, 1908.
926,035.
Patented June 22, 1909.
6 SHEETS—SHEET 6.
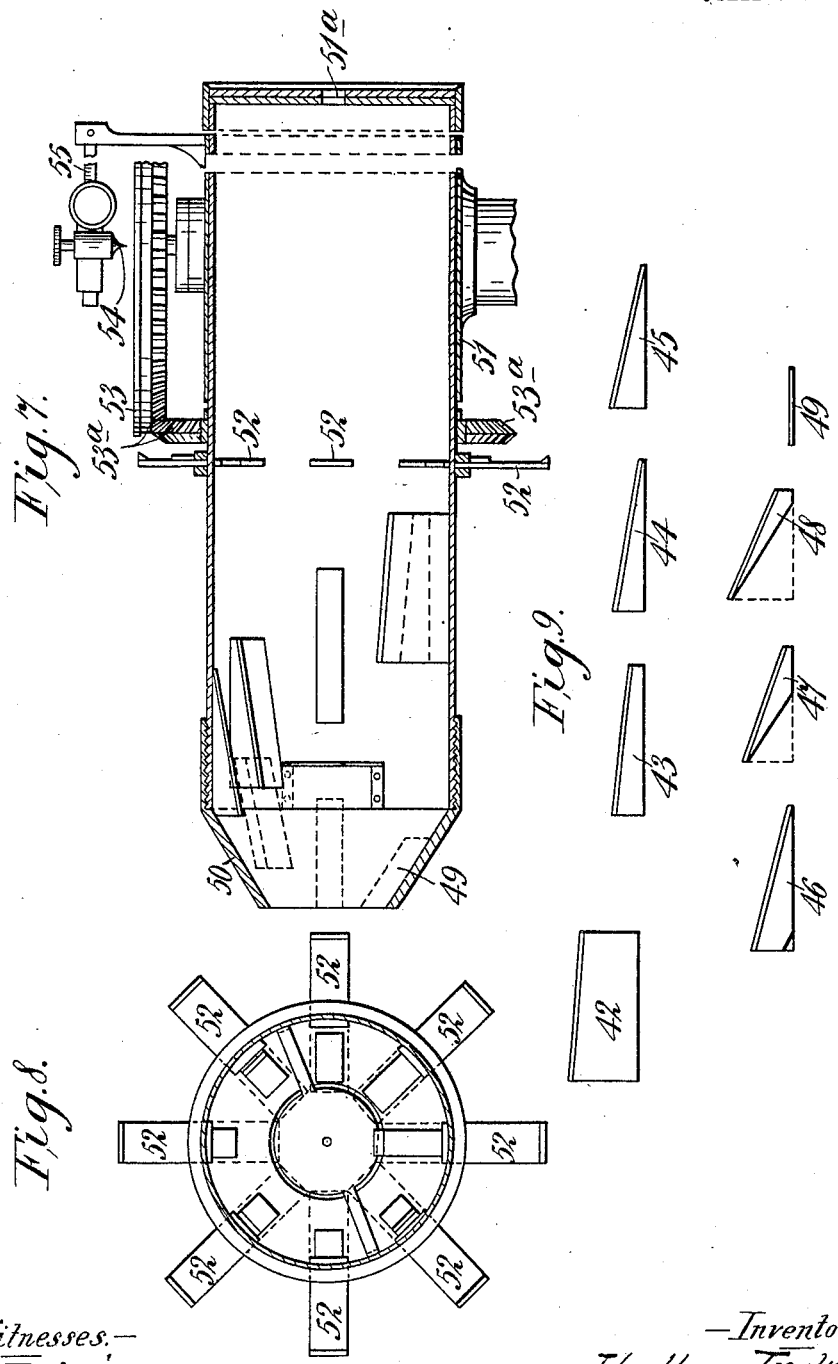

UNITED STATES PATENT OFFICE.

JOHN H. TOMLINSON, OF LONDON, ENGLAND.

SIGHT-TESTING APPARATUS.

No. 926,035.  Specification of Letters Patent.  Patented June 22, 1909.

Application filed January 21, 1908. Serial No. 411,956.

*To all whom it may concern:*

Be it known that I, JOHN HENRY TOMLINSON, a subject of His Majesty the King of Great Britain and Ireland, residing at 510 Birkbeck Bank Buildings, Holborn, London, W. C., England, have invented certain new and useful Improvements in Sight-Testing Apparatus, of which the following is a specification, reference being had therein to the accompanying drawings.

This invention relates to that class of instrument known as perimeters which are used for testing visual fields.

It has hitherto been usual to employ a quadrant or like arm upon which moves a white or colored object used to test the sensitiveness of the peripheral portions of the retina. Now according to the present invention the quadrant is dispensed with and the test object consists of an image of the spot used as the fixing point of the eye, this image being obtained by means of an inclined reflector near the eye.

My invention is hereinafter described with reference to the accompanying drawings forming part of my specification; wherein—

Figure 1:
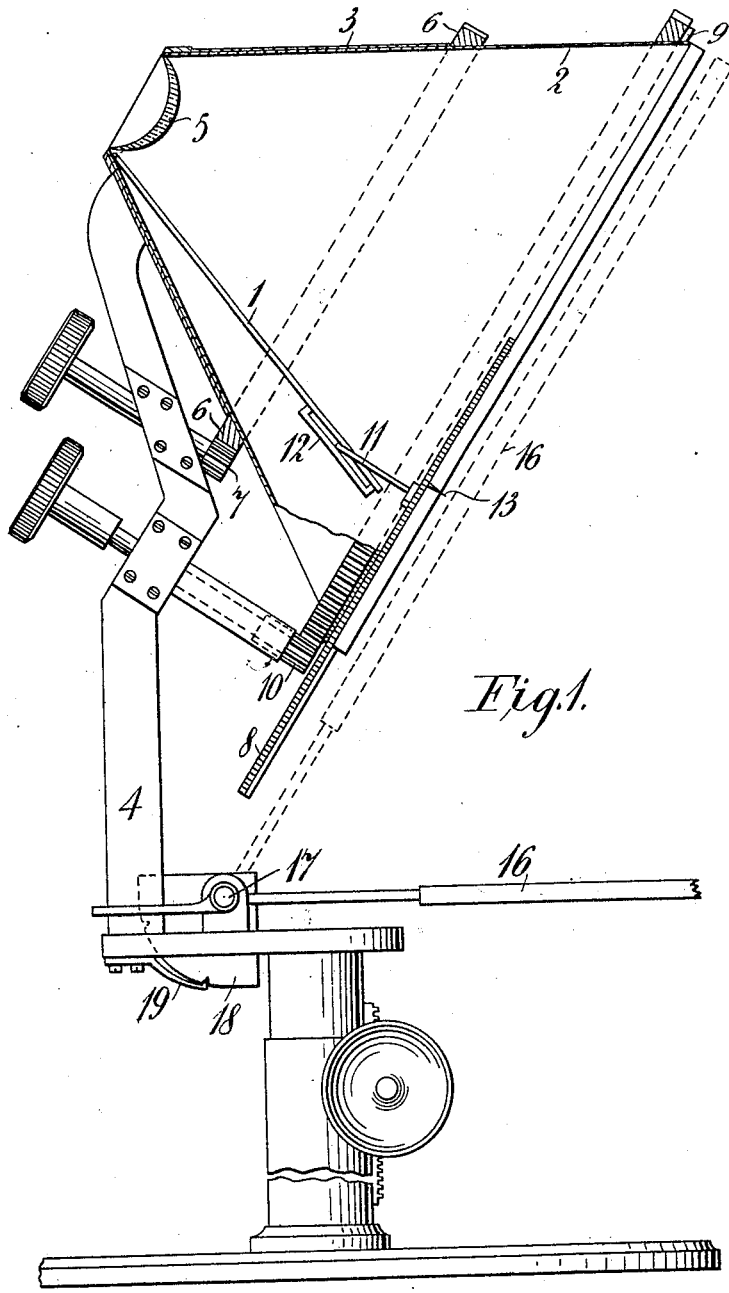
Figure 2:
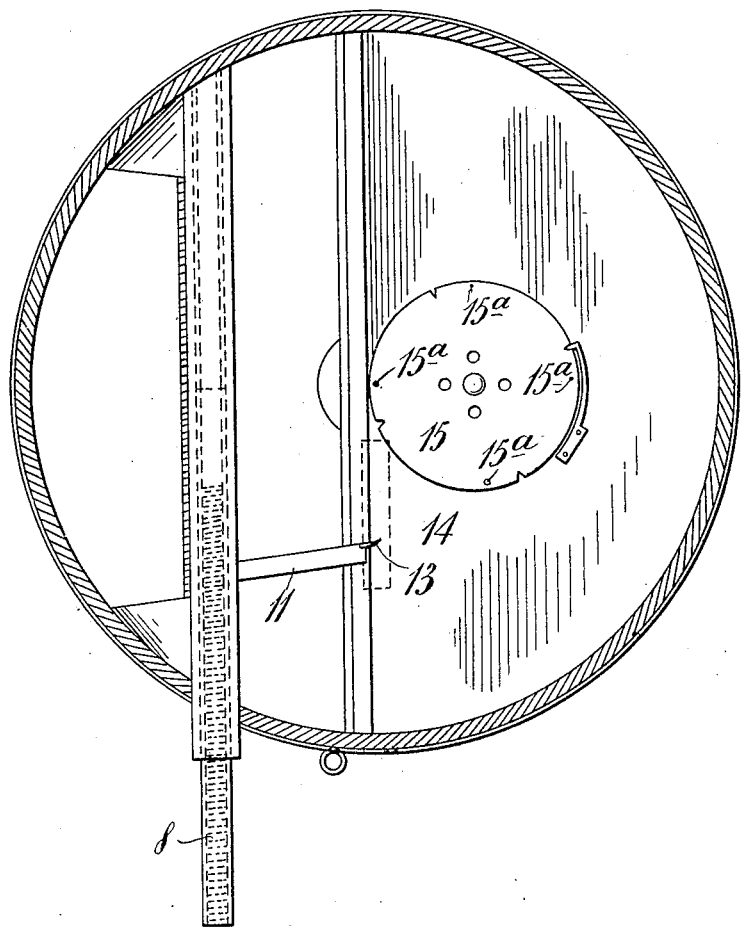
Figure 3:
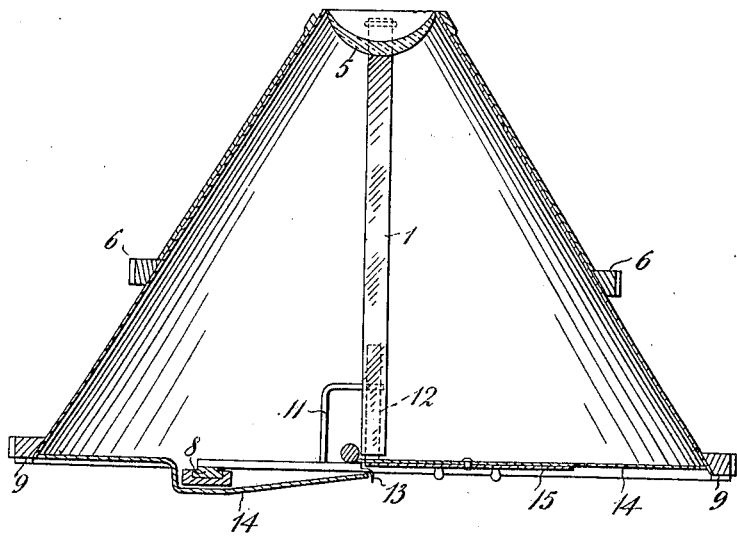

Figure 1 is a side elevation of an example of apparatus, according to my invention, comprising a mirror hinged within a cone shown partly in section; Fig. 2 is a front view of the cone and diaphragm disk; Fig. 3 is a central section through the cone on a plane at right angles to that of Fig. 2; Fig. 4 is a side elevation of a modified construction of apparatus also comprising a hinged mirror; Fig. 4ª is a central longitudinal section through the same; Fig. 5 is a transverse sectional view illustrating the mounting of the mirror; Fig. 6 is a detail view of the links on which the mirror is mounted; Figs. 7 and 8 are respectively a sectional elevation and a front view of a further modification according to my invention; and Fig. 9 consists of a series of diagrams illustrating the inclinations of mirrors employed in this form of apparatus.

In the apparatus illustrated in Figs. 1, 2 and 3, a narrow mirror 1 about 10 centimeters long is hinged at its upper end within a hollow cone 2 capable of rotation in a socket 3 on a stand 4 and fitted with a concavo-convex lens 5 of about 10 centimeters focus in its small end. The cone 2 is rotated about its axis by a wheel 6 worked by a pinion 7 having a milled-headed spindle. The mirror 1 is rocked on its hinge by means of a rack 8 to which motion is given by a crown wheel 9 having also ordinary teeth into which there gears a pinion 10 mounted on a milled-headed spindle. The wheel 9 rides loosely on the cone and its pinion can be withdrawn from gear at will, so that when the cone is being rotated about its axis by the gear 6, 7, the rack 8 is unaffected. This rack is not arranged diametrically across the base of the cone but laterally as shown in Fig. 2. It operates the mirror 1 by a bent arm 11 which works in a race 12 behind the mirror. This bent arm carries a needle 13 which traces a radial path as the rack is advanced. The overlapping semicircular screens 14, Fig. 3 one only of which is shown in Fig. 2, shut in the base of the cone, the needle 13 passing out between them. One of these screens carries a diaphragm disk 15 having a series of perforations 15ª of different sizes any one of which can be brought into the axis of the cone.

A plate 16 hinged at 17 and pierced with a central hole supports a diagram paper. By means of the quadrant 18 and spring 19, the plate 16 can be brought into a horizontal position for inserting the diagram paper, or kept in the position shown in dotted lines in Fig. 1. In this position the spring allows the plate a slight movement on its hinge.

The action is as follows:—A lamp or illuminated screen being placed behind the plate 16, the patient looks down the instrument through the lens 5 and sees the aperture 15ª in the diaphragm-disk illuminated. Supposing the mirror 1 is in its innermost position, nearest to the axis of the cone, he sees a second image of the aperture practically touching the direct image, such second image being the reflection in the mirror of the aperture 15ª. The pinion 10 is now turned to give the rack 8 an outward movement. The patient, while still fixing his eye on the aperture, sees a spot of light moving radially along a meridian of his retina. If at any time he loses sight of this image, the plate 16 with its diaphragm paper is brought up against the needle 13, the point of which thus indicates either the commencement of a blind spot or the limit of the visual field along that meridian.

If the second image becomes again visible along the meridian, the diagram paper is once more pricked and the distance between the two marks represents the radial extent of a blind spot. The cone is now turned through a small angle by the gear 6, 7 and the operation is repeated. The retina may in some instances be explored concentrically instead of radially, i. e., the mirror being set at an angle while the cone rotates so that the image due to reflection traces a circular path on the retina. In consequence of the arrangement of the hinge of the mirror with reference to the principal point of the lens 5, equal movements of the rack 8 do not correspond with quite equal angular displacements of the second image. The graduations of the diagram paper are not therefore quite uniform. It is, however, practicable to curve the race-way 12 in such manner as to rectify the graduations.

In the modified form of instrument shown in Figs. 4 to 6 the mirror 1 is hinged in a tube 20 having a cone-shaped eye-piece and a closed-in extension 21 to allow ample movement to the mirror. The tube 20 is capable of rotation in a tube 22 that may be carried by a stand. The mirror 1 is moved against the action of a spring by a cord 23 which is attached about midway to the back of the mirror, passes over pulleys 24, 25, 26 and is secured to a ring 27 loose on a sleeve 28 which is capable of longitudinal movement on the tube 22 but does not rotate with it. The ring 27 turns with the tube 20 through a pin 29 which is connected to it by a bracket 30 and slides in a slot in the tube. Upon the tube 20 there is keyed a bevel wheel 31 which gears with a bevel pinion 31$^a$ and with a bevel wheel 32$^a$ connected to a table 32 that carries the diagram paper. This table is supported by the fixed tube 22. The sleeve 28 carries an arm 33 to which is hinged an extension 34 carrying a pricker 13. The sleeve is operated by a rack 35 and pinion 36 thereby giving motion to the mirror. As the arm 33 is carried by the sleeve 28 each movement of the mirror 1 gives a corresponding radial movement of the pricker 13 over the diagram paper and as the table 32 moves with the tube 20, at any point the pricker is over a point of the diagram paper corresponding to the point on the retina upon which the second image of the fixing-point falls. This fixing-point is an aperture 37$^a$ in a diaphragm 37 closing the tube 22$^a$. This tube 22$^a$ may be rigidly connected with the tube 22, the total length of both tubes being such that the fixing-point may be focused by the eye without using a lens in the eye-piece. If a mirror mounted on a single hinge were to be used, it would need to be as long as the tube 22. I obviate this difficulty by giving the mirror a movement of translation in addition to its oscillating movement. For this purpose, the mirror 1 is hinged to a bow-link 38, Figs. 5 and 6, at its lower end while its upper end is connected to radius links 39. The link 38 is hinged along a diameter of the tube 20 at 40 and the bars 39 are pivoted at 41 so that the mirror in passing from its extreme position resting against the extension 21, to its extreme innermost position, gradually approaches the axis of the tube 20 until its surface lies along this axis.

Figs. 7 and 8 show a further modification in which a series of mirrors arranged at fixed though different angles is employed. Fig. 9 shows the wedges 42, 43, 44, 45, 46, 47, 48 for the mirrors which are secured to the cone-ended tube 50 mounted rotatably on the closed tube 51. The mirror 49 is secured directly to the cone and partakes of its angle. When an eye looks down the tube at an aperture 51$^a$ in the end of the tube 51, it sees a multiplicity of images reflected from the various mirrors. For each mirror there is provided a shutter 52 so that as many mirrors as desired may be cut out of action. The tube 50 being rotated gives motion to a diagram-carrying table 53 by means of bevel gear 53$^a$, the pricker 54 sliding on a graduated arm 55 and being set to a position corresponding to the particular mirror which at any moment is being used. The concentric method of exploration already described can then be used. I find it convenient to have mirrors set to give reflected images having the following angles with respect to the optical axis of the eye, viz., 10°, 15°, 20°, 25°, 30°, 40°, 50°, 60°.

The instrument, whether of the form shown in Fig. 1, Fig. 4, or Fig. 7, may be mounted on a stand 56 adjustable by means of a rack 57 and a pinion attached to a milled head 58.

What I claim is:—

1. In a perimeter for the testing of visual fields; a tube having at one end an aperture for the eye to be tested, and at its other end a diaphragm wherein there is a perforation that is directly visible and serves as a fixing point for the eye; a mirror that is hinged within said tube, and produces a reflection of the directly visible fixing point, the said reflection serving as a test object, a recording pricker carrier connected with the mirror moving mechanism, and a diaphragm disk movably supported with respect to said pricker to have a record made thereon.

2. In a perimeter for the testing of visual fields; a tube having at one end an aperture for the eye to be tested, and at its other end a diaphragm wherein there is a perforation that is directly visible and serves as a fixing point for the eye; a mirror that is hinged within said tube, and produces a reflection of the directly visible fixing point, the said reflection serving as a test object; mechanism for moving said mirror to cause said reflection to traverse the field of vision of said eye, a recording pricker carrier connected with the mirror moving mechanism, and a diaphragm disk movably supported with respect to said pricker to have a record made thereon.

3. In a perimeter for the testing of visual fields; a tube having at one end an aperture for the eye to be tested, and at its other end a diaphragm wherein there is a perforation that is directly visible and serves as a fixing point for the eye; a mirror that is hinged within said tube, and produces a reflection of the directly visible fixing point, the said reflection serving as a test object; mechanism for moving said mirror to cause said reflection to traverse the field of vision of said eye; a recording pricker carrier connected with the mirror moving mechanism; and a diaphragm disk adapted to have a record made thereon by said pricker.

4. In a perimeter for testing visual fields; the combination of a rotatable tube furnished with an eye aperture at one end; and at the other end with a diaphragm wherein there is a perforation that is directly visible and serves as a fixing point for the eye; mechanism for rotating said tube; a mirror hinged within said tube and adapted to reflect said visible fixing point; mechanism for moving said mirror about its hinge, a recording pricker carrier connected with the mirror moving mechanism, and a diaphragm disk movably supported with respect to said pricker to have a record made thereon.

5. In a perimeter for testing visual fields; the combination of a rotatable tube having an eye aperture at one end; a lens in said eye aperture; a mirror hinged within said tube; mechanism for rotating said tube; mechanism for moving said mirror; a recording pricker actuated by last-mentioned mechanism; and a diagram disk adapted to receive the record of said pricker.

6. In a perimeter for testing visual fields; the combination of a rotatable tube furnished with an eye aperture at one end, and at the other end with an opaque diaphragm wherein there is a translucent perforation serving as a fixing point for the eye; a toothed ring secured around said tube; a toothed pinion meshing with said ring; a mirror hinged within said tube; a second toothed ring loosely mounted on said tube, this ring having teeth on its edge and also teeth on its face to form a crown wheel; a rack geared to said crown wheel; an arm attached to said rack; upon the back of said mirror a race in engagement with said arm; a pricker attached to said arm; a second pinion meshing with aforesaid second toothed ring; and a diagram disk adapted to receive records made by said pricker.

7. In a perimeter for the testing of visual fields; a casing having at one end an aperture for the eye to be tested, and at its other end a diaphragm wherein there is a perforation that is directly visible and serves as a fixing point for the eye; a mirror that is hinged within said casing and produces a reflection of the directly visible fixing point, the said reflection serving as a test object, mechanism for moving said mirror about its hinge, a recording pricker carrier connected with the mirror moving mechanism, and a diaphragm disk movably supported with respect to said pricker to have a record made thereon.

In testimony whereof I affix my signature in the presence of two witnesses.

J. H. TOMLINSON.

Witnesses:
  B. R. WILLIAMS,
  C. S. COOMBE.